United States Patent
Glover et al.

(10) Patent No.: US 10,430,830 B2
(45) Date of Patent: Oct. 1, 2019

(54) ADVERTISEMENT SELECTION USING UNCERTAIN USER DATA

(71) Applicant: Samsung Electronics Co., Ltd., Suwon-si, Gyeonggi-do (KR)

(72) Inventors: Eric Glover, Palo Alto, CA (US); Nikhil Vikram Srinivasan, Lexington, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 718 days.

(21) Appl. No.: 15/066,993

(22) Filed: Mar. 10, 2016

(65) Prior Publication Data

US 2016/0371729 A1 Dec. 22, 2016

Related U.S. Application Data

(60) Provisional application No. 62/180,121, filed on Jun. 16, 2015.

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0248* (2013.01); *G06Q 30/0269* (2013.01)

(58) Field of Classification Search
CPC .................. G06Q 30/0255; G06Q 30/0269
USPC ............ 705/14.49, 14.66, 14.47, 14.4, 14.53
See application file for complete search history.

(56) References Cited

U.S. PATENT DOCUMENTS

| | | | | | |
|---|---|---|---|---|---|
| 5,717,923 | A | * | 2/1998 | Dedrick | G06Q 30/0253 |
| 5,848,396 | A | * | 12/1998 | Gerace | G06Q 30/02 |
| | | | | | 705/7.33 |
| 5,991,735 | A | * | 11/1999 | Gerace | G06Q 30/02 |
| | | | | | 705/7.29 |

(Continued)

OTHER PUBLICATIONS

Dinusha Vatsalan and Peter Christen. "Multi-Party Privacy-Preserving Record Linkage using Bloom Filters." ACM Conference in Information and Knowledge Management, 2014, pp. 1-16.*

(Continued)

*Primary Examiner* — Luis A Brown
(74) *Attorney, Agent, or Firm* — Jefferson IP Law, LLP

(57) ABSTRACT

A method and system are disclosed. The method includes generating uncertain user data corresponding to a user of the user device and transmitting the uncertain user data to a remote computing device. The uncertain user data includes a combination of actual user data and noise data. The method includes receiving an advertisement response message from the remote computing device that includes a plurality of conditional ad objects, each conditional ad object including ad content, one or more access mechanisms, and one or more conditions. The method further includes selecting one or more of the plurality of conditional ad objects based on the actual user data and the one or more conditions defined in the selected conditional ad objects. Furthermore, the method includes displaying, for each selected conditional ad object, an advertisement that is based on the ad content and at least one access mechanism defined in the conditional ad object.

23 Claims, 8 Drawing Sheets

(56) References Cited

U.S. PATENT DOCUMENTS

| | | | |
|---|---|---|---|
| 7,853,700 B2* | 12/2010 | Lee | G06Q 30/02 705/7.29 |
| 7,962,604 B1* | 6/2011 | Morris | G06Q 30/02 705/14.4 |
| 8,321,534 B1* | 11/2012 | Roskind | H04N 21/25808 348/194 |
| 8,666,811 B1* | 3/2014 | Chen | G06Q 30/00 705/14.26 |
| 2001/0029525 A1* | 10/2001 | Lahr | G06F 16/9566 709/218 |
| 2002/0042738 A1* | 4/2002 | Srinivasan | G06Q 30/02 705/14.43 |
| 2003/0106022 A1* | 6/2003 | Goodacre | H04M 1/72525 715/226 |
| 2005/0096979 A1* | 5/2005 | Koningstein | G06Q 10/10 705/14.68 |
| 2005/0096980 A1* | 5/2005 | Koningstein | G06Q 30/00 705/14.41 |
| 2005/0235048 A1* | 10/2005 | Costa-Requena | H04L 29/06027 709/219 |
| 2006/0074769 A1* | 4/2006 | Looney | G06Q 30/02 705/14.66 |
| 2006/0149624 A1* | 7/2006 | Baluja | G06Q 30/0255 705/14.53 |
| 2006/0271438 A1* | 11/2006 | Shotland | G06Q 30/02 705/14.46 |
| 2007/0022442 A1* | 1/2007 | Gil | G06Q 30/02 725/62 |
| 2007/0300152 A1* | 12/2007 | Baugher | G06Q 30/0243 715/210 |
| 2008/0092159 A1* | 4/2008 | Dmitriev | G06Q 30/0269 725/34 |
| 2010/0036717 A1* | 2/2010 | Trest | G06Q 30/0207 705/14.1 |
| 2010/0070373 A1* | 3/2010 | Zoeter | G06Q 30/02 705/14.71 |
| 2010/0222040 A1* | 9/2010 | Bosan | G06Q 30/02 455/414.1 |
| 2012/0278722 A1* | 11/2012 | Raleigh | H04L 12/14 715/735 |
| 2012/0289147 A1* | 11/2012 | Raleigh | H04L 67/2847 455/3.06 |
| 2013/0018731 A1* | 1/2013 | Morris | G06Q 30/02 705/14.66 |
| 2013/0311285 A1* | 11/2013 | Abrol | G06F 16/951 705/14.54 |
| 2013/0337785 A1* | 12/2013 | Delug | H04W 4/60 455/414.1 |
| 2014/0172563 A1* | 6/2014 | Amit | G06Q 50/01 705/14.54 |
| 2014/0236386 A1* | 8/2014 | Yoshizawa | B60W 30/08 701/1 |
| 2014/0250106 A1* | 9/2014 | Shapira | G06F 3/04842 707/722 |
| 2014/0258013 A1* | 9/2014 | Collins | G06Q 30/0625 705/26.3 |
| 2014/0258014 A1* | 9/2014 | Collins | G06Q 30/0241 705/26.3 |
| 2014/0316890 A1* | 10/2014 | Kagan | G06Q 30/0256 705/14.54 |
| 2015/0095160 A1* | 4/2015 | Ma | G06Q 30/0267 705/14.64 |
| 2015/0134436 A1* | 5/2015 | Lambert | G06Q 30/00 705/14.26 |
| 2015/0161149 A1* | 6/2015 | Genera | G06F 16/9537 707/711 |
| 2015/0193546 A1* | 7/2015 | Lipton | G06F 9/445 717/178 |
| 2015/0227633 A1* | 8/2015 | Shapira | G06F 16/2425 707/706 |
| 2015/0254367 A1* | 9/2015 | Kagan | G06F 16/248 707/706 |
| 2015/0371263 A1* | 12/2015 | Kagan | G06F 16/9535 705/14.54 |
| 2016/0034957 A1* | 2/2016 | Kagan | G06F 16/9535 705/14.54 |
| 2016/0063535 A1* | 3/2016 | Xu | G06Q 30/0241 705/14.4 |
| 2016/0085521 A1* | 3/2016 | Savliwala | G06F 16/22 717/108 |
| 2016/0092699 A1* | 3/2016 | Riva | H04L 67/306 726/26 |
| 2016/0092919 A1* | 3/2016 | Coleman, Jr. | G06Q 30/0255 705/14.53 |
| 2016/0162555 A1* | 6/2016 | Shapira | G06F 16/248 707/722 |
| 2016/0210463 A1* | 7/2016 | Fawaz | G06F 21/604 |
| 2016/0313893 A1* | 10/2016 | Xu | G06F 3/0481 |
| 2017/0140421 A1* | 5/2017 | Filev | G06Q 30/02 |
| 2017/0169253 A1* | 6/2017 | Curcio | G06F 21/6263 |
| 2017/0178038 A1* | 6/2017 | Guven | G06Q 10/0635 |

OTHER PUBLICATIONS

Lindell, et al., "A Practical Application of Differential Privacy to Personalized Online Advertising." Department of Computer Science, Bar-Ilan University, Israel, 2011. (Year: 2011).*

Park, et al., "A Social Network-Based Inference Model for Validating Customer Profiles." MIS Quarterly, vol. 36, No. 4, Dec. 2012. (Year: 2012).*

* cited by examiner

ADVERTISEMENT SELECTION USING UNCERTAIN USER DATA

CROSS-REFERENCE TO RELATED APPLICATIONS

The present application claims priority to U.S. Provisional Application 62/180,121, filed on Jun. 16, 2015, the entire disclosure of which is incorporated by reference.

TECHNICAL FIELD

The disclosure relates to a system and method that utilize uncertain user data to provide targeted advertisements without compromising the privacy of the user.

BACKGROUND

Digital marketing and digital advertising help drive today's economy. One reason that advertisers find more value in digital advertising over traditional forms of advertising, such as print and television advertising, is that digital advertising allows advertisers to better target potential consumers because user devices provide very informative information that would not otherwise be available to advertisers in the absence of user devices. For instance, if the advertiser knows a particular user likes an obscure sport such as disc golf based on a signal taken from a social networking application, the advertiser can provide disc-golf-related advertisements to the user. The user would typically not be presented with such advertisements, unless the advertiser was aware of the user's preferences. The tradeoff, however, is the user's privacy. While consumers enjoy having targeted advertising, consumers do not like knowing that their personal information may be readily available to an unintended person. Given the option, many consumers choose to keep their information private.

SUMMARY

According to some implementations of the present disclosure, a method is disclosed. The method includes generating uncertain user data corresponding to a user of the user device and transmitting the uncertain user data to a remote computing device. The uncertain user data includes a combination of actual user data and noise data. The method includes receiving an advertisement response message from the remote computing device. The advertisement response message includes a plurality of conditional ad objects. Each conditional ad object includes ad content, one or more access mechanisms, and one or more conditions. The method further includes selecting one or more of the plurality of conditional ad objects based on the actual user data and the one or more conditions defined in the selected conditional ad objects. Furthermore, the method includes displaying, for each selected conditional ad object, an advertisement that is based on the ad content and at least one access mechanism defined in the conditional ad object.

According to some implementations of the present disclosure, a non-transitory computer readable medium having a set of computer readable instructions stored thereon is disclosed. The computer readable instructions, when executed by a processing device of a user device, cause the processing device to generate uncertain user data corresponding to a user of the user device and transmit the uncertain user data to a remote computing device. The uncertain user data includes a combination of actual user data and noise data. The instructions further cause the processing device to receive an advertisement response message from the remote computing device. The advertisement response message includes a plurality of conditional ad objects, each conditional ad object including ad content, one or more access mechanisms, and one or more conditions. The instructions further cause the processing device to select one or more of the plurality of conditional ad objects based on the actual user data and the one or more conditions defined in the selected conditional ad objects. Furthermore, the instructions further cause the processing device to display, for each conditional ad object, an advertisement that is based on the ad content and at least one access mechanism defined in the conditional ad object.

According to some implementations of the present disclosure, an advertising system is disclosed. The advertising system includes a storage system that stores a plurality of advertisement records. Each advertisement record corresponds to an advertisement and includes triggering data, one or more access mechanisms, ad content, a fee arrangement, and one or more conditions. The system further includes a processing system that executes computer readable instructions. The computer readable instructions cause the processing system to receive an ad request requesting one or more advertisements and an uncertain user profile from a remote computing device. The uncertain user profile corresponds to a user device to which the requested advertisements are directed and includes actual user data and noise data. The instructions further cause the processing system to identify a plurality of advertisement records based on the ad request and/or the uncertain user profile and rank the identified advertisement records. The instructions further cause the processing system to generate an advertisement response message based on the ranked advertisement records. The advertisement response message is a data structure having ordered elements, each element storing a conditional advertisement object. Each conditional advertisement object corresponds to a respective ranked advertisement record and includes ad content from the corresponding ranked advertisement record, one or more access mechanisms, and one or more conditions. At least one of the conditions is to be verified by the user device using the actual user data in order for the advertisement corresponding to the conditional advertisement object to be displayed. The instructions further cause the processing system to transmit the advertisement response message to the remote computing device.

According to some implementations of the present disclosure, a method is disclosed. The method includes generating uncertain user data corresponding to a user of the user device. The uncertain user data includes a demographic profile corresponding to the user based on probabilistic data. The method further includes transmitting the uncertain user data to a remote computing device and receiving an advertisement response message from the remote computing device. The advertisement response message includes a plurality of conditional ad object. Each conditional ad object including ad content, one or more access mechanisms, and one or more conditions. The method includes selecting one or more of the plurality of conditional ad objects based on actual user data and the one or more conditions defined in the selected conditional ad objects. The actual user data contains verifiable information relating to the user or the user device. The method further includes, for each selected conditional ad object, displaying an advertisement that is based on the ad content and at least one access mechanism defined in the conditional ad object.

The details of one or more implementations of the disclosure are set forth in the accompanying drawings and the description below. Other aspects, features, and advantages will be apparent from the description and drawings, and from the claims.

BRIEF DESCRIPTION OF DRAWINGS

Like reference symbols in the various drawings indicate like elements.

DETAILED DESCRIPTION

Figure 1A:
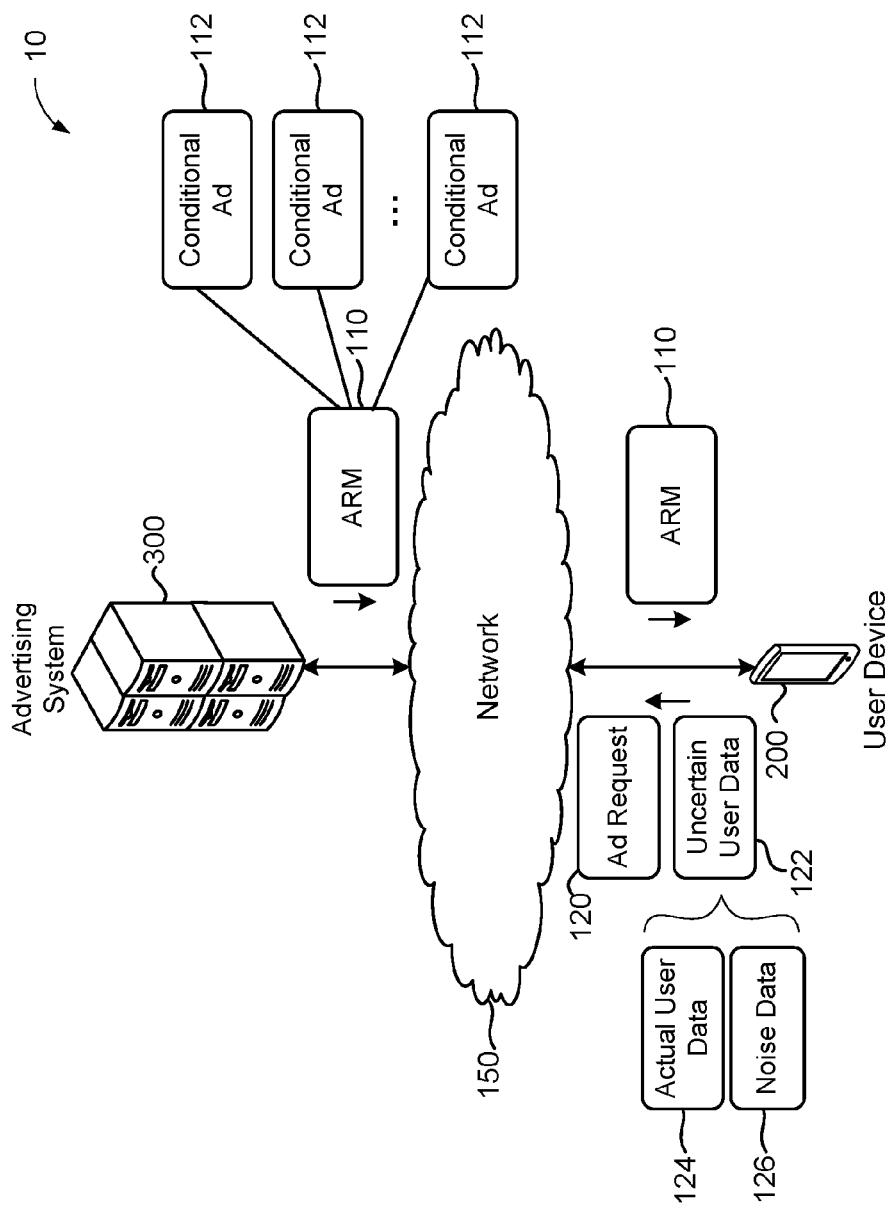
FIGS. 1A and 1B are schematics respectively illustrating an example environment of an advertising system that delivers conditional advertisements.
Figure 1B:
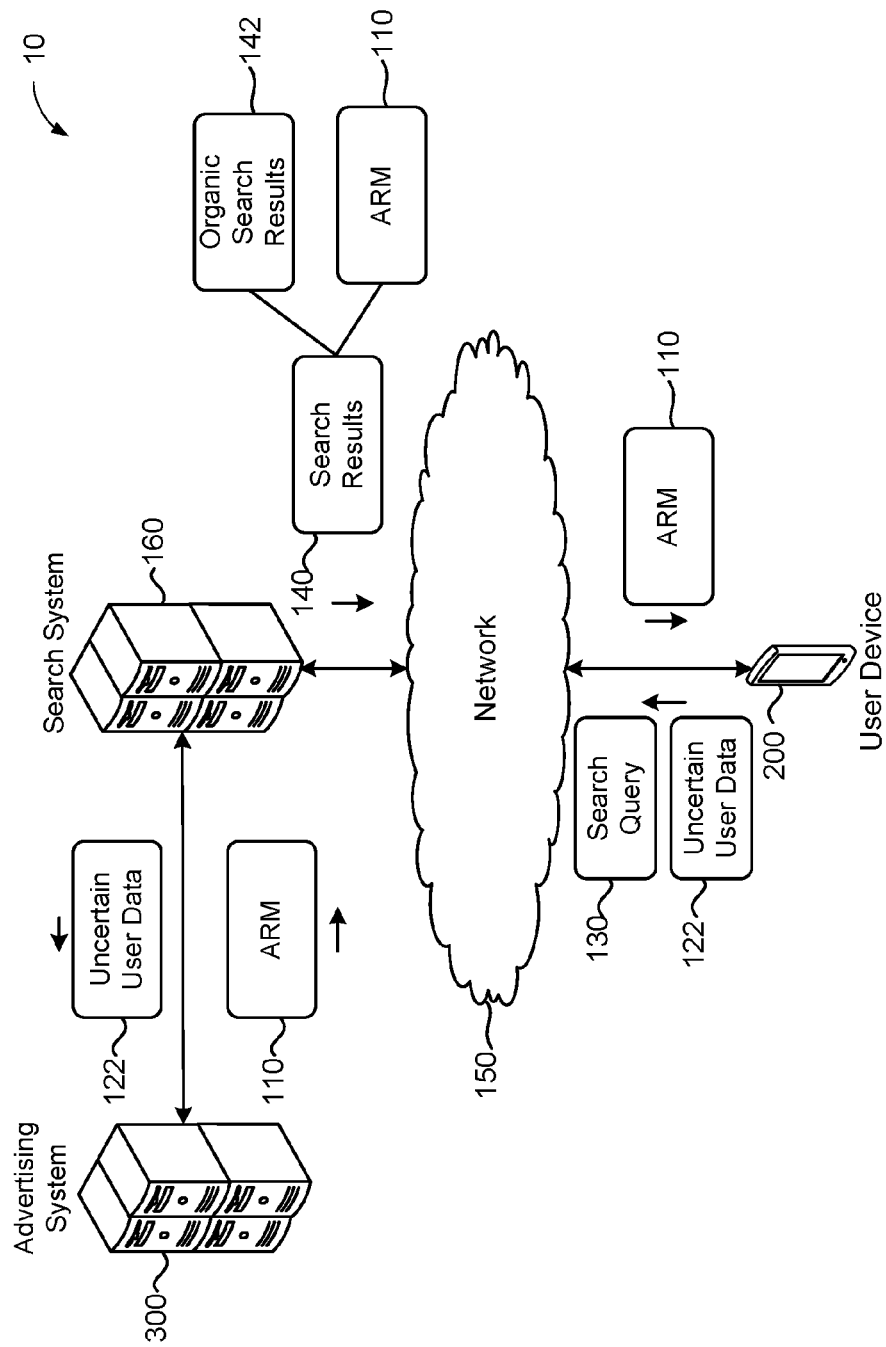

FIGS. 1A and 1B illustrate example environments 10 of an advertising system 300 that provides an advertisement response message 110 ("ARM" 110) to a user device 200 in response to an advertisement request 120 ("ad request" 120). In some implementations, the ad request 120 is transmitted with uncertain user data 122. In some implementations, uncertain user data 122 contains actual user data 124 and noise data 126. The actual user data 124 can be any data relating to the user or the user device 200. Non-limiting examples of actual user data can include, but are not limited to, an age of the user, a home location of the user, a sex of the user, preferences of the user (e.g., "likes" on a social networking application), an online browser history of a user, a current location of the user device, and/or applications that are installed on the user device of the user. The noise data 126 is any data that is added to the actual user data 124 to obfuscate the actual user data 124 or otherwise remove the certainty of the actual user data 124. Examples of noise data 126 are described in greater detail below, but may range from random bits added to a Bloom filter to a fake user profile that is merged with the actual user data 124. In any scenario, the noise data 126 is added to the actual user data 124 to obfuscate the actual user data 124 in a manner where the actual user data 124 cannot be easily deciphered with any certainty when provided with the ad request 120. The ad request 120 can be any data structure that is transmitted to the advertising system 300 via the network. In some implementations, the ad request 120 may identify an application (web or native application) that is being accessed by a user, a specific state of the application that is currently being visited by the user, a search query entered by the user, and/or an indication that the ad system 300 is to deliver an advertisement to the user device 200.

In some implementations, uncertain data 122 may be demographic data that is based on probabilistic data. In these implementations, the demographic data may be requested and obtained from a third-party or otherwise external resource based on one or more features relating to the user device 200 or the user of the user device 200. In some implementations, demographic data may be determined based on general identification data such as an age of the user, the sex of the user, a device type of the user device, browsing history of the user, purchase history of the user, and/or a location of the user. For example, a user may be located in a particular region and may have visited a particular website. In this example, the probabilistic data may find that the user has an 80% probability of being a female between the ages of 25 and 35. The demographic data may include a demographic profile that states the user is a female between the ages of 25 and 35, even though the user may or may not fit within this demographic. Upon receiving the ARM 110 in response to the ad request, the user device 200 may utilize actual user data 124 to verify one or more conditions in the respective conditional ad objects. In another example, demographic data may be determined using an IP address of the user device 200. In another examples, the demographic data may be determined using a device type and/or coarse location (e.g., city and/or state) of the user device 200. The user device 200 may request this information from the third party resource using the general identification data or the user device 200 may transmit the general identification data to the advertising system 300, which in turn transmits the general identification data to the advertising system 300. The third-party resource or external resource may provide the uncertain data to the user device 200 or the advertising system 300.

The advertising system 300 receives the ad request 120 and the uncertain user data 122 and generates an ARM 110 based thereon. The ARM 110 contains a set of conditional advertisement objects 112. A conditional advertisement object 112 may be any suitable data structure that contains data and/or instructions corresponding to a conditional advertisement that is presented by the user device 200 only when the user device 200 can verify a particular condition defined in the conditional advertisement object 112 using the actual user data 124. For example, a user device 200 may have a first application, A, installed thereon but not a second application, B. The actual user data 124 indicates that A is installed on the user device 200, but the noise data 126 may result in the uncertain user data 122 indicating that both A and B are installed on the user device 200. The user device 200 transmits an ad request 120 and the uncertain user data 122 to the ad system 300 via a network 150. The advertising system 300 may include a first conditional advertisement object that defines a first advertisement that is to be displayed if A is installed on the user device 200 and a second conditional advertisement object that defines a second advertisement that is to be displayed if B is installed on the user device 200. The advertising system 300 may encode the first and second conditional advertisement objects 112 into an ARM 110 and may transmit the ARM 110 to the user device 200. The user device 200 receives the ARM 110 and determines that it should display the first advertisement defined in the first conditional advertisement object 112, but not the advertisement defined in second conditional advertisement object 112 because only A is installed on the user device 200. In this way, the advertising system 300 is not able to discern whether A or B is installed on the user device 200, but the user is presented with a targeted advertisement because the user device 200 can verify that A is actually installed on the user device 200.

In the example of FIG. 1A the user device 200 transmits ad requests 120 directly to the advertising system 300. In these examples, the user device 200 may be executing applications (native applications or web applications via a web browser) that are configured to request ads from the advertising system 300. The advertising system 300 receives the ad request 120 and the uncertain user data 122 from a user device 200 and delivers the ARM 110 to the user device 200 in response to the ad request 120 and the uncertain user data 122.

In the example of FIG. 1B, a search system 160 transmits an ad request 120 to the advertising system 300 upon receiving a search query 130 and the uncertain user data 122 from the user device 200. In some implementations, the search system 160 may include the search query 130 or a portion thereof in the ad request 120, whereby the advertising system 300 utilizes one or more of the query terms of the search query 130 to select the conditional ads that are included in the ARM 110. The search system 160 determines organic search results 142 and encodes the organic search results 142 with the ARM 110 in the search results 140. The search system 160 provides the search results 140 to the user device 200. The user device 200 then selects which conditional ad(s) to display in the search engine results page (SERP) based on the actual user data 124.

As used herein, an advertisement can include any digital advertisement. An advertisement includes advertisement content (also referred to as "ad content"). A displayed advertisement may further include a user selectable link (also referred to as a "link"). A link, when selected by a user, sets the state of the user device 200 to a state of a software application. The link may include one or more access mechanisms, whereby the user device 200 accesses the linked to state of the software application using one of the one or more access mechanisms.

Figure 2A:
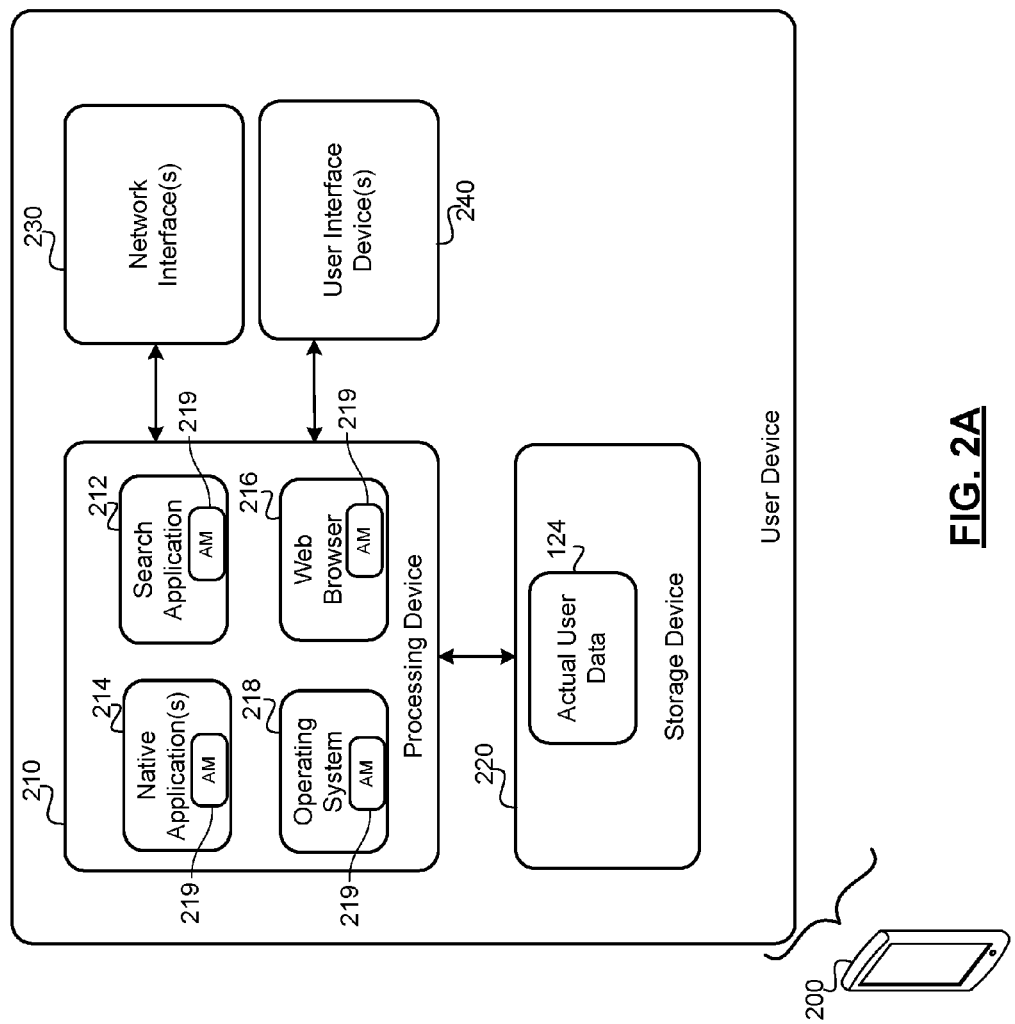
FIG. 2A is a schematic illustrating an example set of components of a user device configured to generate uncertain user data.

FIG. 2A illustrates an example of a user device 200 configured to generate uncertain user data 122 based on actual user data 124 and to select conditional advertising objects based on the actual user data 124. In the illustrated example, the user device 200 includes a processing device 210, a storage device 220, a network interface 230, and a user interface 240. The user device 200 may include additional components not shown in FIG. 2A. The components of the user device 200 may be interconnected by, for example, a bus or other communication circuitry.

The processing device 210 can include one or more processors that execute computer-executable instructions and associated memory (e.g., RAM and/or ROM) that stores the computer-executable instructions. In implementations where the processing device 210 includes more than one processor, the processors can execute in a distributed or individual manner. The processing device 210 can execute an operating system 218, a search application 212 (which may be a native application), one or more native applications 214, and a web browser 216, all of which can be implemented as computer-readable instructions. The operating system 218, the search application 212 (which may be a native application), the one or more native applications 214, and/or the web browser 216 may include an advertisement module 219.

The storage device 220 can include one or more computer-readable mediums (e.g., hard disk drives, solid state memory drives, and/or flash memory drives). The storage device 220 can store any suitable data that is utilized by the operating system of the user device 200. The storage device 220 can be in communication with the processing device 210, such that the processing device 210 can retrieve any needed data therefrom. The storage device 220 can store one or more instances of actual user data 124. In some implementations, the storage device 220 can store one or more instances of uncertain user data 122 in addition to the actual user data 124. The actual user data 124 and/or the uncertain user data 122 may be maintained by operating system 218, the search application 212 (which may be a native application), the one or more native applications 214, and/or the web browser 216.

The network interface 230 includes one or more devices that are configured to communicate with the network 150. The network interface 230 can include one or more transceivers for performing wired or wireless communication. Examples of the network interface 230 can include, but are not limited to, a transceiver configured to perform communications using the IEEE 802.11 wireless standard, an Ethernet port, a wireless transmitter, and a universal serial bus (USB) port.

The user interface 240 includes one or more devices that receive input from and/or provide output to a user. The user interface 240 can include, but is not limited to, a touchscreen, a display, a QWERTY keyboard, a numeric keypad, a touchpad, a microphone, and/or speakers.

The search application 212 generates and displays a graphical user interface (GUI) that allows users to enter search queries 130 and that renders and displays search results 140 that are responsive to the search queries 130 in the GUI. In some implementations, the search application 212 presents the search results 140 in a SERP. An individual search result can include a user selectable link. The user can select a user selectable link displayed in the search results 140. In response to the user selection of the user selectable link, the search application 212 instructs the operating system 218 to access the state of the software application corresponding to the selected link.

The search application 212 receives a search query 130 from a user via a user interface 240. The search application 212 transmits the search query 130 to the search system 160 via the network interface device 230. In some implementations, the search application 212 generates a query wrapper (not shown) that includes the search query 130 and one or more context parameters. A context parameter is additional data that the search system 160 can utilize to determine the search results 140 (e.g., a geolocation of the user device 200). The query wrapper may further include the obstructed user data 122. The obstructed user data 122 may be stored in the storage device 220 and/or may be generated by an ad module 219 (discussed in greater detail below).

The search application 212 receives search results 140 from the search system 160 and renders the search results 140 based thereon. In some implementations, the search results 140 are encoded in container such as an iFrame or a .json file (or an analogous format). As previously indicated, the search results include organic search results 142 and one or more ARMs 110. The search application 212 displays the organic search results 142 and one or more of the conditional ads contained in the one or more ARMs 110, whereby the ARMs 110 contain one or more conditional ad objects 112. In some implementations, ad module 219 determines which conditional ads to display, which is described in greater detail below.

The native applications 214 may be any native applications. Many native applications are configured to display advertisements. Thus, any of the native applications may include an ad module 219 that requests ads to display from the advertising system 300. The ad module 219 is described in greater detail below. A native application 214 may receive an ARM 110 from the advertising system 300. The ad module 219 analyzes the ARM 110 using actual user data 124 to determine which advertisements to display to the user. These advertisements may be presented by the native application via the user interface 240.

The web browser 216 is a native application that allows users to access a web application edition of a software application. The web browser 216 quests content from a resource using an access mechanism (e.g., a URL) and displays the requested content. Either the web browser 216 itself or the web application edition may execute an ad module 219.

An ad module 219 may be a set of computer readable instructions that are executed by the processing device 210. Alternatively the ad module 219 may be implemented as a service. The ad module 219 contains logic for obtaining the obstructed user data 122 and selecting which conditional ads to display to the user. Furthermore, in some implementations, the ad module 219 generates and transmits an ad request 120. An ad module 219 may be implemented in any suitable application (web or native).

In operation, the ad module 219 may be called in response to any number of actions. For instance, if the ad module 219 is called by the search application 212, the ad module 219 may be called when a user initiates a search by entering a search query 130. Similarly, if the ad module 219 is called by a native application 214, the native application 214 may call the ad module 219 when the application transitions to a new state or is first launched.

In response to being called, the ad module 219 obtains the uncertain user data 122. The uncertain user data 122 may be stored on the storage device 220. Additionally or alternatively, the ad module 219 may retrieve actual user data 124 from the storage device 220 and/or from an external resource and may generate the uncertain user data 122 based on the actual user data 124 and noise data 126. The uncertain user data 122 may be represented in any suitable data structure.

Actual user data 124 is any data that is specific to the user device 200 or a user associated with the user device 200. Examples of actual user data 124 may include a list of native applications that are installed on the user device 200, a list of native applications that have been uninstalled from the user device, a home location (e.g., city and state) of the user, a sex of the user, preferences of the user (e.g., "likes" on a social networking application), an age of the user, and/or an online browser history of a user. Actual user data 124 may be maintained by the operating system and/or applications that are executed by the user device 200. In the event some of the actual user data 124 is maintained by a specific application, that actual user data 124 may be restricted to use only by the specific application, or may be shared when the user explicitly agrees to share that actual user data 124 with another application. Other actual user data 124 may be shared with any application. For example, a list of applications that are installed on or uninstalled from the user device 200 may be shared with the native applications of the user device 200. The user may need to give explicit consent for an application to record the actual user data 124.

Noise data 126 is any data that may be added to or included in the actual user data 124 to create the uncertain user data 122. Put another way, noise data 126 is any data that may be added to the actual user data 124 such that the actual user data 124 cannot be determined with a certainty. The noise data 126 may be randomly generated data. The noise data 126 may be fake user data that is maintained by the user device 200. As will be discussed in greater detail, fake user data is any information that is maintained by any application that appears to be actual user data 124 but does not actually reflect the actual user data 124. For example, fake user data may include a fake list of applications that are installed on the user device 200 and a fake list of applications that have been uninstalled from the user device 200. Additionally or alternatively, the fake user data may indicate a fake age of the user, a fake sex of the user, fake preferences of the user, fake location data of the user, and/or a fake browser history of the user.

In some implementations, the uncertain user data 122 is encoded in one or more Bloom filters. In these implementations, a Bloom filter is encoded with the actual user data 124 and noise data 126. A Bloom filter is a probabilistic data structure (typically a binary array) that is used to determine whether a particular item is a member of a set. The binary array is an N bit array, where each bit is referenced by a number between 0 and N−1. A value representing an element may be encoded into the array using k different values between 0 and N−1. In particular, each potential item in a set is given a unique value. For instance, each known application may be assigned a unique value or each known song may be assigned a unique value. When an element (e.g., a value representing the item) is contained in the actual user data 124 (e.g., a particular native application is installed on the user device 200), the ad module 219 can feed the value representing the item into k independent hash functions (where k is greater than or equal to one) or a single hash function that receives two or more parameters including the value representing the element, where the single hash function outputs k different hash values. For each of the hash values, the ad module 219 can set the bit corresponding to the hash value equal to one. For example, if the Bloom filter has a length of 128 bits, and the hash values corresponding to an element having a unique value of 10312014 are [10, 17, 39, and 94], the ad module can set the bits at spots 10, 17, 39 and 94 all equal to one. By doing so, the Bloom filter indicates that the element 10312014 is associated with the user device 200. Examples of how to encode and decode a Bloom filter are described in U.S. patent application Ser. No. 14/288,058, the contents of which are hereby incorporated by reference. In addition to encoding applications that are installed on a user device 200, other suitable data can be encoded in a Bloom filter, including but not limited to, geographic information, media contents on the device, browsing history, recently accessed information, preferences, personal information, and "likes" on social media platforms.

In implementations where the uncertain user data 122 is included in a Bloom filter, the ad module 219 can obtain the actual user data 124 from the storage device 220. Each individual instance of actual user data 124 may be represented by a value. For each value, the ad module 219 can hash the value to obtain k different values and can set the corresponding bits in the Bloom filter equal to one. The ad module 219 can add noise data 126 to the Bloom filter in any suitable manner. In some implementations, the ad module 219 can randomly flip bits in the Bloom filter. By flipping a bit, the Bloom filter may have false negatives in addition to false positives. For example, when the ad module 219 randomly flips a bit from a one to a zero, one or more items that may have been indicated by the Bloom filter may no longer be indicated. Similarly, when the ad module 219 randomly flips a bit from zero to one, the ad module 219 may add one or more items to the uncertain user data 122. In this way, when the uncertain user data 122 is communicated to the advertising system 300, the advertising system 300 does not know with a certainty which items are actually indicated in the actual user data 124 corresponding to the user device 200 and/or user. In some implementations, the ad module 219 randomly flips zeros in the Bloom filter to ones, but not ones to zeros. In these implementations, the amount of false positives increases, but there are no false negatives.

In some implementations, the ad module 219 maintains a fake user data, which is used as the noise data 126. For example, the ad module 219 can maintain a fake list of applications that are installed on the user device 200 and/or have been uninstalled from the user device 200. The ad module 219 can maintain this list as if it were actual user data, such that when it encodes an actual list of installed and/or uninstalled applications into a Bloom filter, the fake list of installed and/or uninstalled applications into the Bloom filter. In this way, the advertising system 300 cannot monitor the uncertain user data 122 over a period of time to identify the actual user data 124.

In some implementations, the uncertain user data 122 is stored in a user profile format. The user profile format may be a container (e.g., a JSON file or XML file) that stores different types of data in predefined fields. The user profile may include fields for information, including but not limited to demographic data (e.g., age, sex, hometown, etc.), a list of applications installed on the user device, a list of applications uninstalled on the user device, a browser history, and/or preferences (e.g., "likes" on social networking applications). In the event the user profile contains fields for demographic data, the fields may have multiple fields for one or more of the types of demographic data. For example, the user profile may indicate that the user is male and female and/or may indicate that the user has three different hometowns (e.g. Detroit, Mountain View, New York). In this way, the advertising system cannot determine with a certainty whether the user is male or female or where the user lives. The ad module 219 can generate the user profile using the actual user data 124 and noise data 126. As was previously discussed, the ad module 219 can maintain fake user data, such as a fake list of installed applications, a fake list of uninstalled applications, a fake hometown of a user, fake preferences of a user and/or a fake browsing history. The ad module 219 can maintain the fake user data by randomly selecting items to include in the fake user profile or by probabilistically selecting items to include in the fake user profile. The ad module 219 can select from sets of known items that can be included in the fake user profile. For example, the ad module 219 can select from a known set of applications, a known set of preferences, a known set of web sites (for a browser history), a known set of cities, etc. The ad module 219 merges the actual user data 124 and the fake user data/profile to generate the uncertain user profile.

In some implementations, the ad module 219 may issue a request for the uncertain user data 122 from a third party resource. In these implementations, the third party resource may return the uncertain user data 122 in the form of demographic data. The ad module 219 may include information such as a location, sex, and/or age of the user to obtain the demographic data.

The ad module 219 (or the application calling the ad module 219) may transmit the uncertain user data 122 to a remote computing device, such as an advertising system 300, a search system 160, or any other suitable device. In response to the uncertain user data 122, the advertising system 300 outputs an ARM 110, which is transmitted to the user device 200 (either directly or via another device). The specific details on how an ARM 110 is determined is discussed in greater detail below. The ad module 219 receives the ARM 110 and determines which of the conditional ad objects 112 to select for display based on conditions contained in the conditional ad objects 112 and the actual user data 124. As some of the conditional ad objects 112 in the ARM 110 are included in the ARM 110 only because of the noise data 126 communicated in the uncertain user data 122, the ad module 219 can filter out these conditional ad objects 112.

Figure 2B:
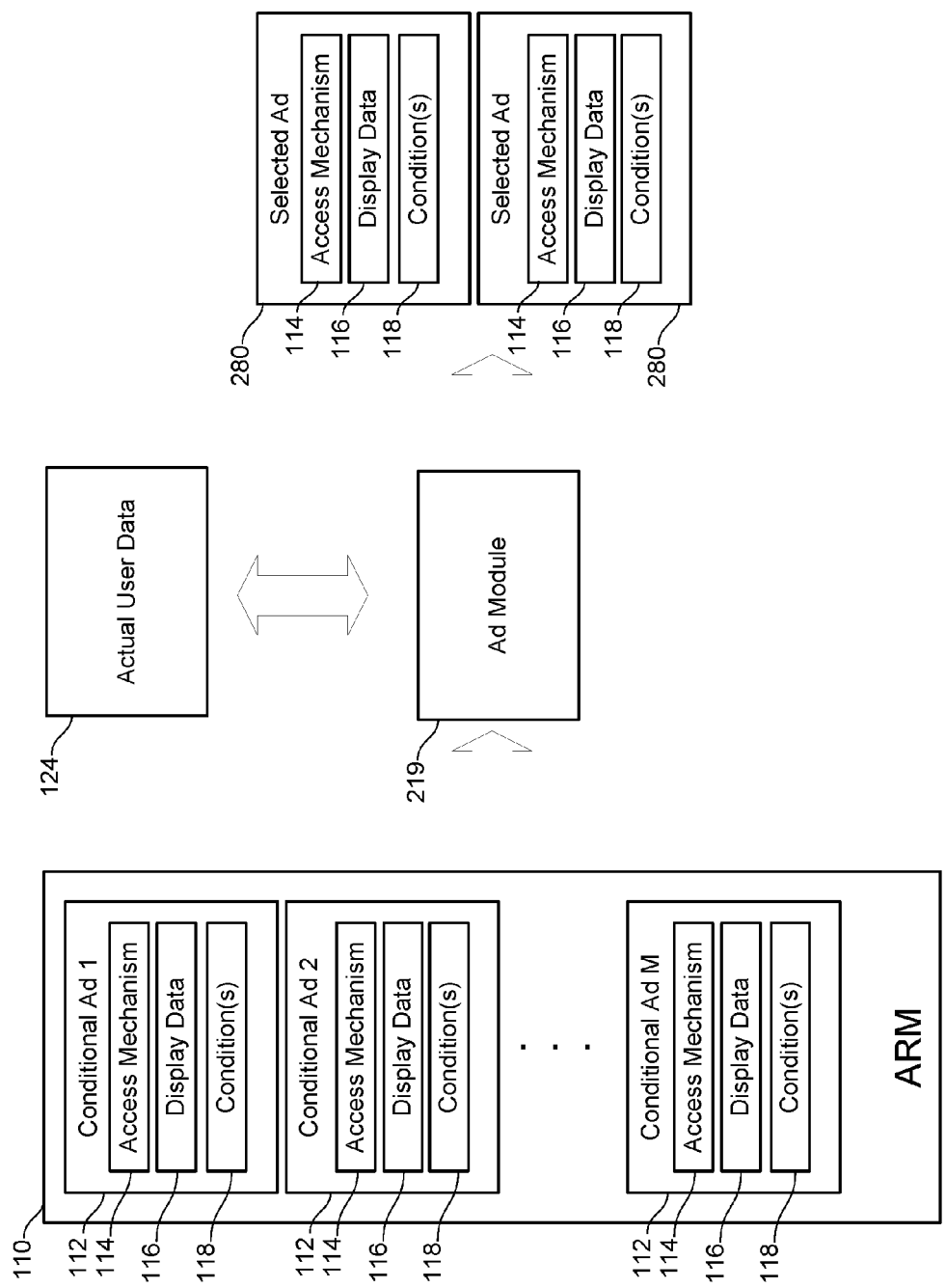
FIG. 2B is a schematic illustrating an example input and output of the ad module when selecting advertisements to display.

FIG. 2B illustrates an example input and output of the ad module 219 when selecting ads to display according to some implementations of the present disclosure. In operation, the ad module 219 receives the ARM 110. As previously discussed, each ARM 110 contains N conditional ad objects 112, where N is an integer greater than or equal to one. Each conditional ad object 112 may contain one or more access mechanisms 114, display data 116, and one or more conditions 118. In some scenarios, however, a conditional ad object 112 may contain zero access mechanisms 114 if the underlying advertisement does not link to resource. The conditions 118 may define logic that if satisfied makes the conditional ad eligible for selection. For example, the condition 118 may be if an application, A, is installed on the user device 200 then the conditional ad object 112 is eligible to be displayed. If this condition is not satisfied, then the conditional ad object 112 is not selected as it is not eligible to be displayed. In another example, the condition 118 may be if the user is a male and lives in the state of California, then the conditional ad object 112 is eligible to be displayed. The ad module 219 selects one or more of the conditional ad objects 112 in the ARM 110 based on the conditions 118 of the respective conditional ad objects 112 and the actual user data 124 that was used to generate the uncertain user data 122. The conditional ad objects 112 that are selected by the ad module 219 for display may be referred to as selected ad objects 280.

In some implementations, the ad module 219 assesses the conditional ad objects 112 in the ARM 110 in accordance with the respective rankings of the conditional ad objects 112 in the ARM 110. Put another way, the ad module 219 analyzes the conditional ad objects 112 in the ARM 110 in the order in which the conditional ad objects 112 are stored in the ARM 110. Furthermore, for each conditional ad object 112, the ad module 219 accesses the actual user data 124 to determine whether the condition 118 defined in the conditional ad object 112 is met by the actual user data 124. For example, the ad module 219 may begin by determining whether to select the first conditional ad object 112 contained in the ARM 110. If the condition 118 of the first conditional ad is met by the actual user data 124, then the conditional ad is selected for display. If the condition 118 is not met, then the conditional ad object 112 is disregarded and the ad module 219 assesses the second conditional ad object 112. The ad module 219 iterates through the ARM 110 in this manner until it has selected a requisite number of selected ads 280 to display. For example, if the ads are to appear in a SERP, the SERP may have space allocated for two advertisements. Thus in such a scenario, the ad module 219 can select up to two conditional ad objects 112 to include in the SERP. In the example of FIG. 2B, the ad module 219 has selected two selected ad objects 280 to be displayed. In this scenario, the conditions 118 of the selected conditional ad objects 280 were verified by the actual user data 124. Once the conditional ad objects 112 have been selected, the application (e.g., native application, web application, or search application) that called the ad module 219 can render the selected ad objects 280 using the display data 116 and one or more access mechanisms (to the extent the selected ad object 280 includes access mechanisms). As the ad module 219 is responsible for selecting ad objects based on the actual user data 124, the privacy of the user is better protected.

Figure 3A:
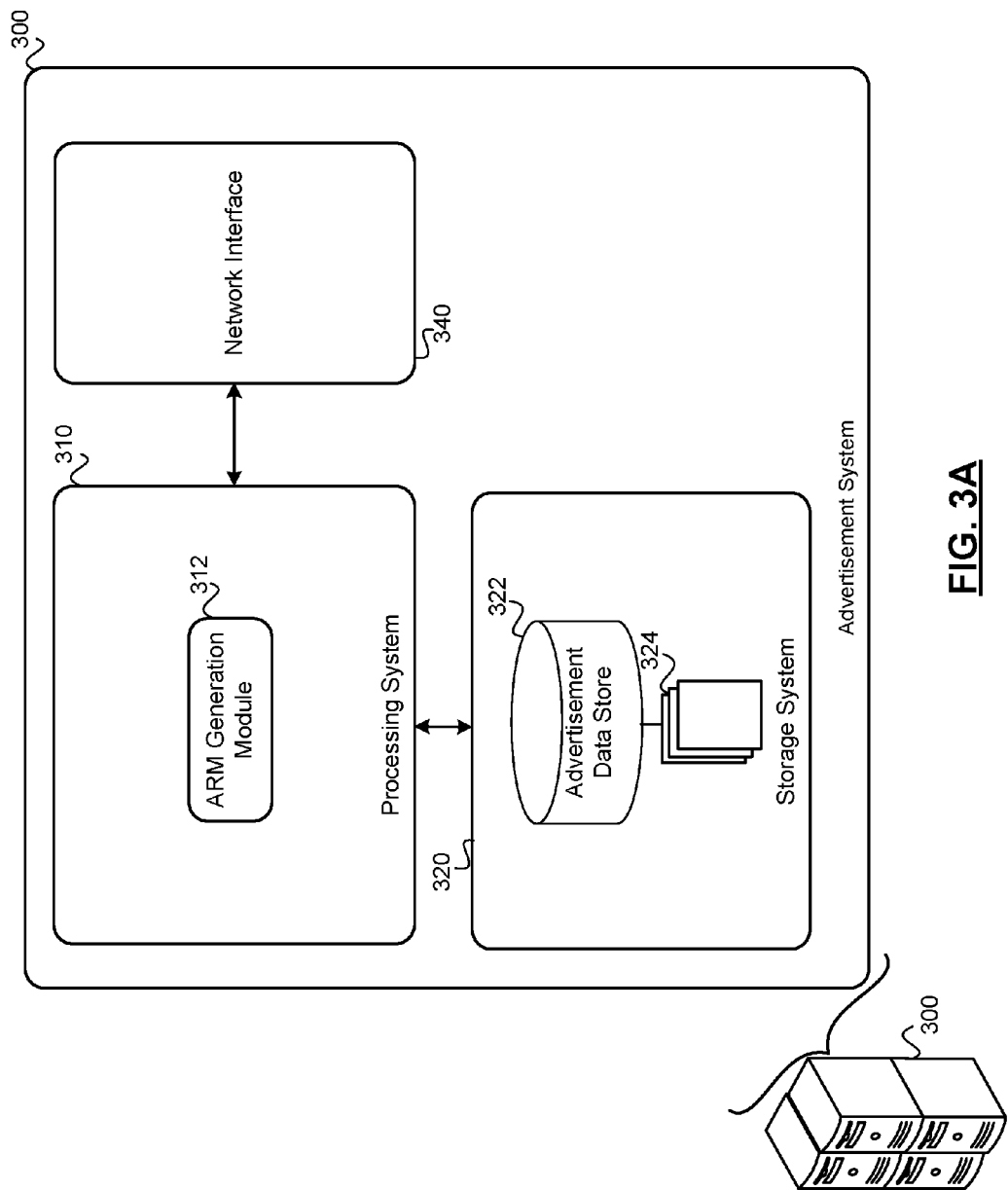
FIG. 3A is a schematic illustrating an example set of components of an advertising system.

FIG. 3A illustrates an example of an advertising system 300. The advertising system 300 may receive ad requests 120 and uncertain user data 122 and may return an ARM 110. The advertising system 300 may receive ad requests 120 from a user device 200 directly or from an intermediate device, such as a search system 160. The advertising system 300 includes a processing system 310, a storage system 320, and a network interface 340.

The processing system 310 is a collection of one or more processors that execute computer readable instructions. In implementations having two or more processors, the two or more processors can operate in an individual or distributed manner. In these implementations, the processors may be connected via a bus and/or a network. The processors may be located in the same physical device or may be located in different physical devices. Moreover, the processors may be located at different physical locations. The processing system executes an ARM determination module 312.

The network interface device 340 includes one or more devices that perform wired or wireless (e.g., Wi-Fi or cellular) communication. Examples of the device types of the network interface device include, but are not limited to, a transceiver configured to perform communications using the IEEE 802.11 wireless standard, an Ethernet port, a wireless transmitter, and/or a universal serial bus (USB) port.

The storage system 320 includes one or more storage devices. The storage devices may be any suitable type of computer readable mediums, including but not limited to read-only memory, solid state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 320 stores an advertisement data store 322. Example contents of the advertisement data store 322 is discussed in greater detail below.

The advertisement data store 322 stores an advertisement inventory. An advertisement, when rendered at a user device 200, includes a user selectable link that links to a particular state of an application. Advertisements are provided by advertisers (i.e., any third party). Typically advertisers agree to pay a price-per-action for an advertisement. Examples of a price-per-action include a price-per-impression, a price-per-click, and a price-per-purchase. While price-per-action schemes are the most prevalent, advertisers may agree to other fee arrangements.

Figure 3B:
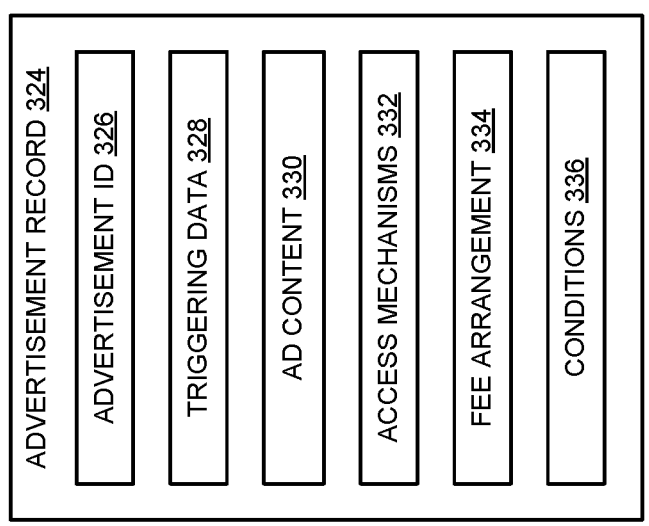
FIG. 3B is a schematic illustrating an example advertisement record.

In some implementations, the advertisement inventory is comprised of a plurality of advertisement records 324. Each advertisement record 324 corresponds to an advertisement. FIG. 3B illustrates an example of an advertisement record 324. An advertisement record 324 may include an ad ID 326, triggering data 328, ad content 330, one or more access mechanisms 332, a fee arrangement 334, and one or more conditions 336.

The ad ID 326 can be any string of letters, numbers, and/or characters that uniquely identify the advertisement from other advertisements. The ad ID 326 may be a unique number, a URL corresponding to the ad, a text string describing the advertised state or any other suitable string. The ad ID 326 may be generated and assigned to the record 324 when the record is generated by the advertising system 300.

The triggering data 328 is the data that causes the ARM determination module 312 to include the advertisement in an ARM 110. Put another way, the ARM determination module 312 identifies advertisement records 324 based the contents of the ad request 120 and the triggering data 328 of the advertisement records 324. Triggering data 328 can include keywords, application state identifiers (e.g., URLs or state IDs), application identifiers (e.g., application names or application IDs), or user preferences (e.g., "likes" on a social networking application). The triggering data 328 can be indexed in an inverted index that is queried with information from an ad request 120 (e.g., one or more keywords, an application state, an application identifier, or a user preference) and outputs advertisement records 324 that contain the triggering data or the ad IDs 326 of such advertisement records 324.

The ad content 330 includes any data that is displayed in the advertisement when rendered. Ad content 330 can include text (e.g., a description of the linked to state or a description of a product), visual data such as icons or pictures, video data, or any other suitable data. The ad content 330 may include the actual data, pointers to memory locations where the actual data may be found, or locations of third party resources (e.g., URLs) from which the third party data may be requested. The ad content 330 may be included in a conditional ad object 112 as the display data 116 when the advertisement record 324 is selected by the ARM determination module 312 for inclusion in an ARM 110.

The one or more access mechanisms 332 are the access mechanisms that link to the linked to state of an application. As a state of an application may be accessed using different application editions (e.g., web application editions or different native application editions), there may be more than one access mechanism that may be used to access a state. For instance, a first access mechanism may be a URL used to access a state of an application via a web browser. A second access mechanism may be an application resource identifier that is used to access the same state of the application via a first native application edition configured for a first operating system. A third application access mechanism may be an application resource identifier that is used to access the same state via a second native application edition configured for a second operating system.

The fee arrangement 334 may define the agreement between an advertiser and the advertising system 300. The fee arrangement 334 can define the action that the advertiser wishes to pay for. For example, the fee arrangement 334 can define whether the advertiser agrees to pay for an impression, a click, or a purchase. The fee arrangement 334 also defines the cost per action. For example, the cost may be fifty cents per click or ten cents per impression.

The conditions 336 define conditions that must be satisfied in order for the ad to be displayed. In some implementations, the conditions are defined as Boolean statements that when satisfied may result in the impression of the corresponding advertisement. For example, a condition of an advertisement may be: If the set of installed applications includes Application A then display the advertisement. In another example, the condition may be: If the user likes basketball on a social media platform and the user device has Application B installed thereon, then display the advertisement. In another example, the condition may be: If the user has visited website A in the past month and lives within 100 miles of this city then display the advertisement. The conditions 336 can be expressed in any suitable notation without departing from the scope of the disclosure.

Referring back to FIG. 3A, the ARM determination module 312 may be comprised of a set of computer readable instructions that are executed by the processing system 310. In some implementations, the ARM determination module 312 receives an ad request 120 and uncertain user data 122 and returns an ARM 110. The ARM determination module 312 uses the content of the ad request 120 and/or the uncertain user data 122 to determine which conditional ads to include in the ARM 110.

In some implementations, the ARM determination module 312 receives the ad request 120 and the uncertain user data 122 and identifies one or more advertisement records 324 based on the ad request 120 and/or the uncertain user data 122. In some implementations, the ARM determination module 312 queries the inverted index with content contained in the ad request 120 and/or the uncertain user data 122. The inverted index returns advertisement records 324 (or ad IDs 326 thereof) that have triggering data 328 that matches to the content in the ad request 120 or in the uncertain user data 122. The ARM determination module 312 ranks the returned advertisement records 324. In some implementations, the ARM determination module 312 can rank the returned advertisement records 324 based on a respective score of each advertisement record 324.

The score of an advertisement record 324 can be calculated in any suitable manner. In some implementations, the score may be based on the expected value of the advertisement. The expected value may be calculated at request time or may be calculated off-line. In the event that the expected value is calculated at request time, the expected value may be a function of the ad request, the uncertain user data, the fee arrangement and/or historical data relating to the advertisement. For instance, in a cost-per-click fee arrangement, the expected value may be the product of the price per click and the probability of a click given the ad request 120 and the uncertain user data 122. Put another way, the expected value is based on the probability that the ad would be clicked on taking the information in the ad request 120 and the uncertain user data 122 as true. Thus, the ARM determination module 312 may reference historical data to determine how often the particular ad is selected when displayed in response to certain data (i.e., the data of the ad request 120 or the uncertain user data 122). In other examples, if the fee arrangement is a cost-per-impression arrangement, then the expected value is equal to the cost-per-impression, as the probability of an impression is one. The foregoing ignores the fact that the ad module 219 that requested the ad may not actually display the ad due to a condition of the ad not being met by the actual user data or the ranking of the ad being too low. The foregoing scenarios do not affect the expected value of the ad. In other implementations, the ARM determination module 312 determines the score of an ad based on a degree to which the triggering data 328 of an advertisement record 324 matches the content of the ad request 120 and/or the uncertain user data 122. For instance, if the triggering data 328 contains keywords and the ad request 120 includes terms from a search query, then the score of the advertisement record 324 may be based on the degree to which the keywords in the triggering data 328 match the terms of the search query. In other implementations, the ARM determination module 312 may utilize scoring functions to score the advertisement records 324. Additionally or alternatively, the ARM determination module 312 may determine feature vectors corresponding to each advertisement record 324 and may feed the feature vectors into a machine learned scoring model (e.g., gradient boosted decision trees). In these implementations, the scoring model outputs a score of the advertisement record 324 based on the feature vector and previously learned data. The feature vector may include features of the advertisement records itself, features of the content of the ad request 120 and uncertain user data 122, and features of the content of the ad request 120 and uncertain user data 122 in relation to the advertisement record. The ARM determination module 312 can determine the score of an advertisement record in any other suitable manner.

The ARM determination module 312 can rank the advertisement records 324 based on their respective scores. The ARM determination module 312 then generates an ARM 110 based on the ranked advertisement records 324. The ARM determination module 312 may select the highest M ranking advertisement records for inclusion in the ARM 110 or may include all of the ranked advertisement records for inclusion in the ARM 110. For each advertisement record 324 that is to be included in the ARM 110, the ARM determination module 312 generates a conditional ad object 112 based on the advertisement record 324. The conditional ad object 112 includes display data 116 that is based on the content data 330 contained in the advertisement record 324 and one or more conditions 118 based on the conditions 336 contained in the advertisement record 324. The conditional ad object 112 may further include one or more access mechanisms 114 based on the access mechanism(s) 332 contained in the advertisement record 324. The conditional ad object 112 may include instructions and additional data that is used to render the ad at the user device 200. The ARM determination module 312 inserts the conditional ad objects in the ARM 110 in accordance with rankings of the respective advertisement record 324. The conditional ad object corresponding to the highest ranking advertisement record 324 is inserted in the first element of the ARM 110, the conditional ad object corresponding to the second highest ranking advertisement record 324 in the second element of the ARM 110, and so on and so forth. In this way, the ad module 219 that provided the ad request 120 can begin with the first element of the ARM 110 and can iterate through the ARM 110 to determine which ads to display.

In some implementations, the ARM determination module 212 may include one or more unconditioned conditional ad objects 112 at the end of the ARM 110. The unconditioned conditional ad objects 112 correspond to ads that are to be displayed if none of the conditions of the higher ranked conditional ad objects 112 are met by the actual user data 124. In this way, if all of the conditional ad objects are included in the ARM 110 as a result of noise data, the ad determination module 312 may still display an ad to the user. Furthermore, one or more of the unconditioned conditional ad objects may be identical to one or more of the conditional ad objects that have conditions, such that if the ad determination module 312 provides feedback to which ads are selected by a user, the advertising system 300 may still be precluded from determining the user's actual user data with a high degree of certainty.

The ARM determination module 312 (or a related module) transmits the ARM 110 to a downstream device. In some implementations, the ARM determination module 312 transmits the ARM 110 directly to the user device 200 that provided the uncertain user data 122. In other implementations, the ARM determination module 312 transmits the ARM 110 to an intermediate device such as a search system 160 or an application system (e.g., an application server) of a third-party application. In this scenario, the intermediate device may transmit the ARM 110 to the user device 200 that provided the uncertain user data 122.

Figure 4:
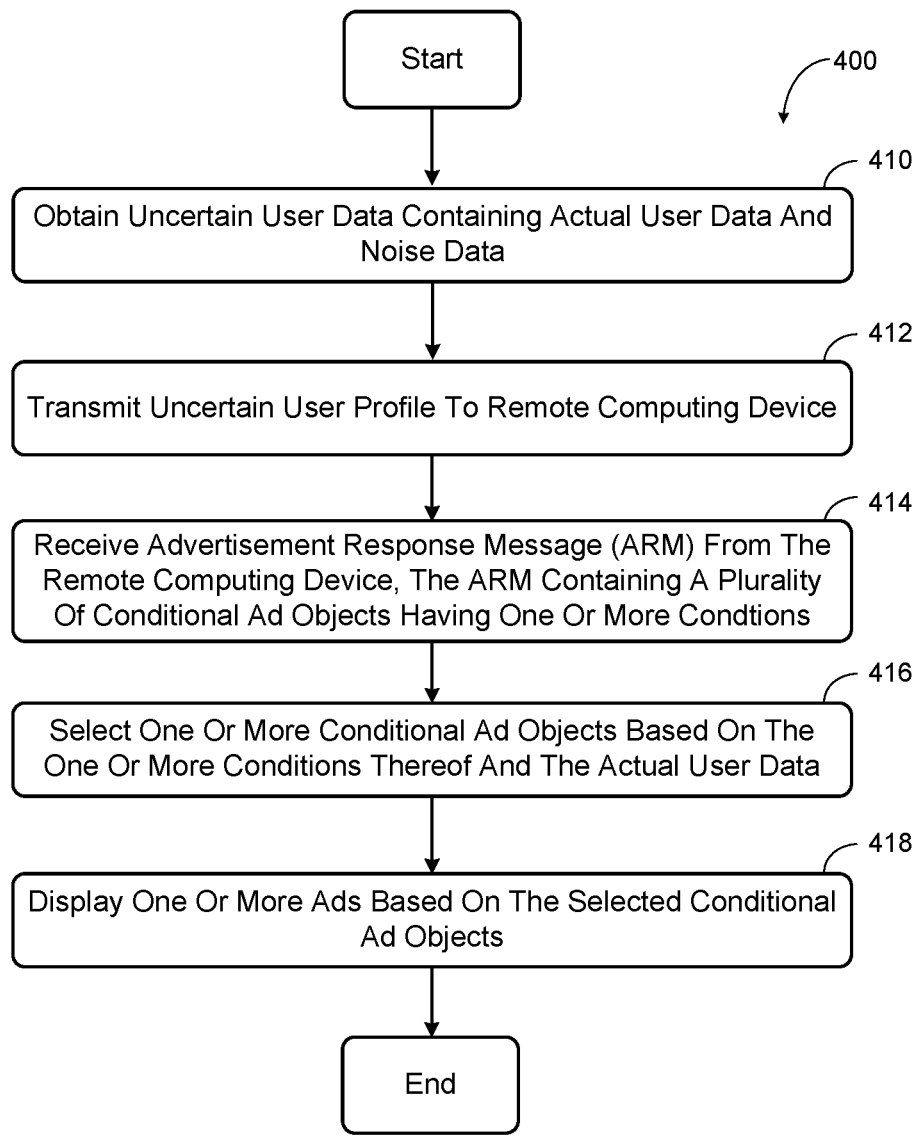
FIG. 4 is a flow chart illustrating example operations of a method for displaying advertisements at a user device.

FIG. 4 is a flow chart illustrating an example set of operations of a method 400 for displaying advertisements on a user device. The method 400 helps protect the privacy of users. The method 400 may be executed by a processing device 210 of a user device 200. For purposes of explanation, the method 400 is described with respect to an ad module 219, which may be called by any suitable application.

At 410, the ad module 219 obtains uncertain user data 122. The ad module 219 may be called by, for example, a native application 214, a web browser 216, and/or search application 212 (which may also be a native application 214). For example, a native application 214 may be configured to display ads to users or a search application 212 may be configured to include ads in a SERP. In the former scenario, the ad module 219 may include the uncertain user data 122 with an ad request 120. In the latter scenario, the ad module 219 may include the uncertain user data 122 with a search query 130. The ad module 219 can retrieve the uncertain user data 122 from the storage device 220 of the user device 200 or may generate the uncertain user data 122 at call time. In the former scenario, the ad module 219 can generate the uncertain user data 122 at any suitable time (e.g., daily or weekly) and store the generated uncertain user data 122 in the storage device 220. In either scenario, the ad module 219 generates the uncertain user data 122 based on actual user data 124 and noise data 126. In some implementations the noise data 126 is random data that is added to the actual user data 124. In other implementations, the noise data 126 is a fake user profile that the ad module 219 maintains. The structure of the uncertain user data 122 may be any suitable structure, including a Bloom filter or a user profile. In some implementations, the ad module 219 may obtain the uncertain user data 122 in the form a demographic data. The ad module 219 may obtain this data from a third-party resource or may maintain this data based on collected statistical data.

At operation 412, the ad module 219 transmits the uncertain user data 122 to a remote computing device. The remote computing device may be the advertising system 300, a search system 160, or any other suitable device. The ad module 219 may transmit the uncertain user data 122 to the remote computing device independently or with a request such as an ad request 120 or a search query 130.

At operation 414, the ad module 219 receives an ARM 110 from the remote computing device. The ARM 110 includes a plurality of conditional ad objects 112. Each conditional ad objects includes display data 116, one or more access mechanisms 114, and one or more conditions 118 (FIG. 2B). The ad module 219 may receive the ARM 110 independently or with other data (e.g., in a set of search results 142).

At operation 416, the ad module 219 selects one or more conditional ad objects 112 based on the one or more conditions defined in the selected conditional ad objects and the actual user data 124. In implementations where the ARM 110 is a data structure containing ordered elements (e.g., an array), the ad module 219 iteratively analyzes each conditional ad object 112 according to the ordering of the ARM 110. For each conditional ad object 112, the ad module 219 checks the condition(s) 118 of the conditional ad object 112 against the actual user data 124. If the actual user data 124 matches the condition(s) 118 of the conditional ad object 112, the ad module 219 includes the conditional ad object 112 in the ads to be displayed. If the conditions 118 of the conditional ad object 112 are not met, the ad module 219 may ignore the conditional ad object 112. The ad module 219 can continue in this manner until a maximum number of conditional ad objects 112 are selected or the ad module 219 has iterated through the entire ARM 110. The maximum number of conditional ad objects 112 may be defined by the application that calls the ad module 219 and/or by the ad module 219. At operation 418, the ad module 219 can render and display the ads in the displayed screen (e.g., GUI) of the application that called the ad module 219.

Figure 5:
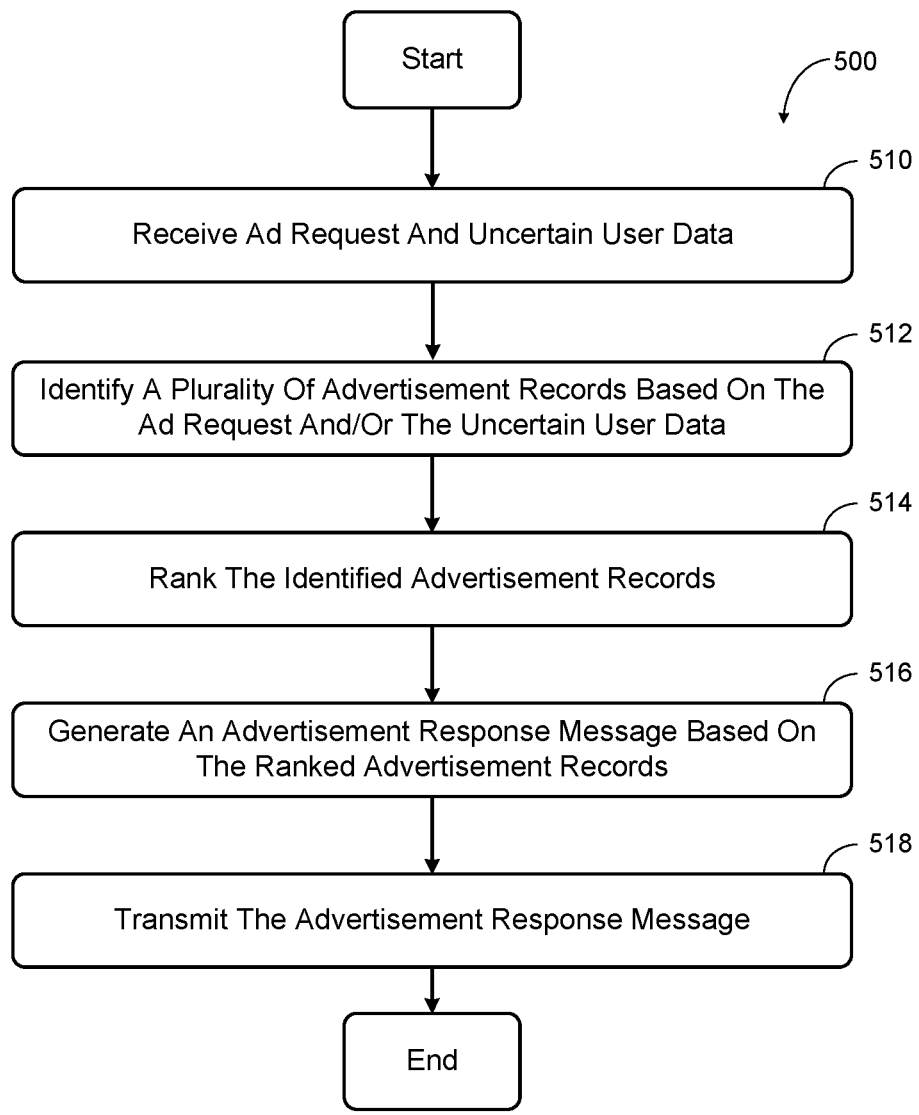
FIG. 5 is a flow chart illustrating example operations of a method for generating an advertisement response message.

FIG. 5 illustrates an example method 500 for generating an ARM 110. The method 500 may be performed by any suitable device. For purposes of explanation, the method 500 is explained with respect to the advertising system 300 described above.

At operation 510, the ARM determination module 312 receives an ad request 120 and uncertain user data 122 from a remote computing device. The remote computing device may be a search system, a user device, an application server, or the like. The ad request 120 may include any suitable data, including but not limited to, query terms provided in a search query, a URL of an accessed application state, or an application identifier of an accessed application. The uncertain user data 122 may indicate any suitable data that may correspond to the user and/or the user device 200. The uncertain user data 122 includes actual user data 124 and noise data 126. In some implementations, the ARM determination module 312 decodes the uncertain user data 122. For instance, if the uncertain user data 122 is contained in a Bloom filter, the ARM determination module 312 may query the Bloom filter to determine which items are likely encoded in the Bloom filter.

At operation 512, the ARM determination module 312 identifies a plurality of advertisement records 324 from the advertisement data store 322 based on the ad request 120 and/or the uncertain user data 122. In some implementations, the ARM determination module 312 queries an inverted index with the content of the ad request 120 and/or instances of the uncertain user data 122. For example, the ARM determination module 312 may query the inverted index with one or more query terms contained in the ad request 120 or data contained in the uncertain user data 122 (e.g., application identifiers indicated in the uncertain user data 122 or media contents indicated in the uncertain user data). The inverted index may return advertisement records 324 that were relevant to the content used to query the inverted index.

At operation 514, the ARM determination module 312 ranks the identified advertisement records 324. The ARM determination module 312 may score each advertisement record 324. The ARM determination module 312 may score the advertisement records 324 in any suitable manner. The ARM determination module 312 may score the advertisement records 324 based on an expected value of each advertisement record 324. The ARM determination module 324 may score the advertisement records 324 based on a degree to which the triggering data of each advertisement record 324 matches the content of the ad request 120 and/or the uncertain user data 122. Additionally or alternatively, the ARM determination module 312 may score the advertisement records 324 based on the degree to which the content of the ad request 120 and/or the uncertain user data 122 match the advertisement record. The ARM determination module 312 may score the advertisement records 122 using predetermined scoring functions. The ARM determination module 312 may determine feature vectors corresponding to each advertisement record 324 and may feed the feature vectors into a machine learned scoring model (e.g., gradient boosted decision trees). In these implementations, the scoring model outputs a score of the advertisement record 324 based on the feature vector and previously learned data. The feature vector may include features of the advertisement records itself, features of the content of the ad request 120 and uncertain user data 122, and features of the content of the ad request 120 and uncertain user data 122 in relation to the advertisement record. The ARM determination module 312 may determine the score of the records 324 in any other suitable manner. The ARM determination module 312 ranks the advertisement records 324 based on their respective scores.

At operation 516, the ARM determination module generates an ARM 110 based on the ranked advertisement records 324. The ARM determination module 312 may generate an ordered data structure (e.g., an array), whereby the each element of the data structure contains a conditional ad object 112. For each scored advertisement record 324 or for each of the N highest scoring advertisement records 324, the ARM determination module 312 generates a conditional ad object 112 for the advertisement record 324. The ARM determination module 312 may instantiate a conditional ad object and may assign values to the conditional ad object based on the corresponding advertisement record 324. The ARM determination module 312 may include the ad content 330, the one or more access mechanisms 332, and the one or more conditions 336 contained in the advertisement record 324 in the conditional ad object 112. The ARM determination module 312 includes the populated conditional ad object 112 in the ARM 110 in accordance with its ranking. Thus, the conditional ad object 112 corresponding to the highest scoring advertisement record 324 is inserted in the first element of the ordered data structure, the conditional ad object corresponding to the second highest scoring advertisement 324 is inserted in the second element of the ordered data structure, and so on and so forth.

At operation 518, the ARM determination module 312 transmits the ARM 110 to the remote computing device. The ARM determination module 312 may transmit the ARM 110 to the remote computing device that requested the ARM 110. The ARM determination module 312 may transmit the ARM 110 to the remote computing device that will ultimately display one or more of the advertisements defined in the ARM 110 (e.g., a user device). The ARM determination module 312 may transmit the ARM 110 to a search system, a user device, an application server, or the like.

The methods 400, 500 of FIGS. 4 and 5 are provided for example. Variations of the methods 300, 400 are contemplated and are within the scope of the disclosure.

As used in throughout the application, the term "software application" can refer to a software product that causes a computing device to perform a function. In some examples, a software application may also be referred to as an "application," "an app," or a "program." Example software applications include, but are not limited to, productivity applications, social media applications, messaging applications, media streaming applications, social networking applications, and games. Software applications can perform a variety of different functions for a user. For example, a restaurant reservation application can make reservations for restaurants. As another example, an internet media player application can stream media (e.g., a song or movie) from the Internet. The functions of an application can be accessed using native application editions of the software application and/or web application editions of the software application.

A native application edition (or "native application") is, at least in part, installed on a user device 200. In some scenarios, a native application is installed on a user device 200, but accesses an external resource (e.g., an application server) to obtain data from the external resource. For example, social media applications, weather applications, news applications, and search applications may respectively be accessed by one or more native application editions that execute on various user devices 200. In such examples, a native application can provide data to and/or receive data from the external resource while accessing one or more functions of the software application. In other scenarios, a native application is installed on the user device 200 and does not access any external resources. For example, some gaming applications, calendar applications, media player applications, and document viewing applications may not require a connection to a network to perform a particular function. In these examples, the functionality of the software product is encoded in the native application editions itself. The native application edition is able to access the functions of the software application without communicating with any other external devices.

Web application editions (also referred to as "web applications") of a software application may be partially executed by a user device 200 (e.g., by a web browser executed by the user device 200) and partially executed by a remote computing device (e.g., a web server or application server). For example, a web application may be an application that is executed, at least in part, by a web server and accessed by a web browser (e.g., a native application) of the user device 200. Example web applications may include, but are not limited to, web-based email, online auctions websites, social-networking websites, travel booking websites, and online retail websites. A web application accesses functions of a software product via a network. Example implementations of web applications include webpages and/or HTML-5 application editions.

In some scenarios, a software application may be accessed by one or more native application editions of the software application and/or one or more web application editions of the software application. In these scenarios, there may be overlap between the states or functions that the native application edition(s) can access and the states or functions that the web application edition can access. A user device 200 can access a state of a software application via an edition of the software application using an access mechanism.

Examples of access mechanisms can include, but are not limited to, application access mechanisms, web access mechanisms, application download addresses, and scripts. An application access mechanism may be a string that includes a reference to a native application and indicates one or more parameters or operations that the user device 200 uses to access the referenced state. An application resource identifier is an example application access mechanism.

A web access mechanism may be a string that includes a reference to a web application edition of a software product, and indicates one or more parameters and/or operations for a web browser to execute. A web access mechanism may be a resource identifier that includes a reference to a web resource (e.g., a page of a web application/website). For example, a web access mechanism may refer to a uniform resource locator (URL) used with hypertext transfer protocol (HTTP). If a user selects a user selectable link including a web access mechanism, the user device 200 may launch a web browser application and may pass the resource identifier to the web browser. The web browser can utilize the resource identifier to retrieve the web resource indicated in the resource identifier and/or access a function of the software application indicated by the resource identifier.

An application download access mechanism may indicate a location (e.g., a digital distribution platform) where a native application can be downloaded in the scenario where a native application edition of the application is not installed on the user device 200. If a user selects a user selectable link including an application download access mechanism, the user device 200 may access a digital distribution platform from which the referenced native application edition may be downloaded. The user may opt to download the native application edition. Upon doing so, the user device 200 may launch the native application edition and may access the state of the software application using the native application edition and an application access mechanism associated with the user selectable link.

A script is a set of instructions, that when executed by the user device 200 cause the user device to access a resource indicated by the script. For example, the script may instruct an operating system of the user device 200 to launch the native application, and may define one or more additional instructions to access a particular state of the application. Another type of access mechanisms may include scripts, which may be used instead of other type of access mechanism when an edition of a software application is not configured to be referenced by the other types of access mechanisms.

While an advertisement does not require a link, an advertisement typically contains a link that is based on one or more access mechanisms. In the event a state of an application may be accessed using multiple editions, the linked to state may be accessed with multiple different access mechanisms depending on the configuration of the application. The advertising system 300 may, however, include conditional advertisement objects used to render any suitable advertisements.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

The invention claimed is:

1. A method comprising:
    identifying, by a processing device, at least one user data including a combination of actual user data and noise data;
    wherein identifying the at least one user data includes:
        identifying an actual user profile based on the actual user data, the actual user profile including one or more first data fields, each of the one or more first data fields having an actual value assigned thereto indicative of the actual user data;
        identifying a fake user profile as the noise data, the fake user profile including one or more second data fields, each of the one or more second data fields having a fake value assigned thereto, the fake value being different than the actual value; and
        obtaining the at least one user data by combining the actual user profile and the fake user profile;
    transmitting, by the processing device, the identified at least one user data to a remote computing device;
    receiving, by the processing device, an advertisement response message from the remote computing device, the advertisement response message including one or more ad content, and one or more conditions, wherein the one or more ad content, and the one or more conditions are identified based on the identified at least one user data including the combination of the actual user data and the noise data by the remote computing device;
    in response to identifying that a first condition among the one or more conditions is satisfied based on the actual user data, identifying, by the processing device, a first ad content corresponding to the first condition among the one or more ad content; and
    displaying, by the processing device, an advertisement that is based on the first ad content.

2. The method of claim 1, wherein identifying the at least one user data includes:
    retrieving the actual user data from a storage device of an user device;

encoding a Bloom filter using the actual user data, the Bloom filter being a binary array; and adding the noise data to the Bloom filter by randomly reassigning one or more bits of the binary array.

3. The method of claim 1, wherein the advertisement response message is a data structure having a plurality of ordered elements, each of the ordered elements containing one of one or more conditional ad objects, each of the one or more conditional ad objects including one of the one or more ad content, one of one or more access mechanisms, and one of the one or more conditions.

4. The method of claim 3,
wherein identifying the first ad content includes:
identifying a number of displaying the advertisement; and
iteratively analyzing the conditional ad objects included in the advertisement response message until the number of identifying of at least one of the one or more ad content is equal to a preset maximum number according to the ordering of the ordered elements, and
wherein analyzing the conditional ad objects includes:
identifying whether at least one of the one or more conditions are met by the actual user data;
when the at least one of the one or more conditions are met, identifying the at least one of the one or more ad content corresponding to the at least one of the one or more conditions; and
when the at least one of the one or more conditions are not met, disregarding the at least one of the one or more ad content.

5. The method of claim 1 further comprising:
obtaining, by the processing device, an ad request requesting the advertisement response message; and
transmitting, by the processing device, the ad request with the identified at least one user data to the remote computing device, wherein the remote computing device is an advertising system.

6. The method of claim 1 further comprising:
receiving, by the processing device, a search query via a user interface of an user device;
transmitting, by the processing device, the search query with the identified at least one user data to the remote computing device, wherein the remote computing device is a search system;
receiving, by the processing device, search results from the search system, the search results including organic search results and the advertisement response message; and
displaying, by the processing device, a search engine results page that includes the organic search results and the advertisements that are based on the identified first ad content.

7. The method of claim 1, wherein the actual user data includes a list of installed applications that are installed on an user device and the noise data includes a fake list of applications, the fake list indicating applications that are not actually installed on the user device, and wherein the at least one user data is a combination of the list of installed applications and the fake list of applications.

8. The method of claim 1, wherein the first condition asks whether a particular application is installed on the user device, whereby the first ad content is selected only if the particular application installed.

9. The method of claim 1, further comprising requesting, by the processing device, a demographic profile from a third party resource.

10. The method of claim 1, further comprising:
receiving the advertisement response message including the one or more ad content, the one or more conditions, and one or more access mechanisms, wherein the one or more ad content, the one or more conditions, and the one or more access mechanisms are identified based on the identified at least one user data including the combination of the actual user data and the noise data by the remote computing device;
in response to identifying that a first condition among the one or more conditions is satisfied based on the actual user data, identifying, by the processing device, the first ad content corresponding to the first condition among the one or more ad content, and a first access mechanism corresponding to the first condition among the one or more access mechanisms; and
displaying, by the processing device, an advertisement that is based on the first ad content and the first access mechanism.

11. A non-transitory computer readable medium having a set of computer readable instructions stored thereon, the computer readable instructions, when executed by a processing device of a user device, causing the processing device to:
identify at least one user data including a combination of actual user data and noise data;
wherein identifying the at least one user data includes:
identifying an actual user profile based on the actual user data, the actual user profile including one or more first data fields, each of the one or more first data fields having an actual value assigned thereto indicative of the actual user data;
identifying a fake user profile as the noise data, the fake user profile including one or more second data fields, each of the one or more second data fields having a fake value assigned thereto, the fake value being different than the actual value; and
obtaining the at least one user data by combining the actual user profile and the fake user profile;
transmit the at least one user data to a remote computing device;
receive an advertisement response message from the remote computing device, the advertisement response message including one or more ad content, and one or more conditions, wherein the one or more ad content and the one or more conditions are identified based on the identified at least one user data including the combination of the actual user data and the noise data by the remote computing device;
in response to identifying that a first condition among the one or more conditions is satisfied based on the actual user data, identify a first ad content corresponding to the first condition among the one or more ad content; and
display an advertisement that is based on the first ad content.

12. The non-transitory computer readable medium of claim 11, wherein identifying the at least one user data includes:
retrieving the actual user data from a storage device of an user device;
encoding a Bloom filter using the actual user data, the Bloom filter being a binary array; and
adding the noise data to the Bloom filter by randomly reassigning one or more bits of the binary array.

13. The non-transitory computer readable medium of claim 11, wherein the advertisement response message is a data structure having a plurality of ordered elements, each of the one or more ordered elements containing one of one or more conditional ad objects, each of the one or more conditional ad objects including one of the one or more ad content, one of one or more access mechanisms, and one of the one or more conditions.

14. The non-transitory computer readable medium of claim 13,
wherein identifying the first ad content includes:
identifying a number of displaying the advertisement; and
iteratively analyzing the conditional ad objects included in the advertisement response message until the number of identifying of at least one of the one or more ad content is equal to a preset maximum number according to the ordering of the ordered elements, and
wherein analyzing the one or more ad content includes:
identifying whether at least one of the one or more conditions is met by the actual user data;
when the at least one of the one or more conditions is met, selecting at least one of the one or more ad content corresponding to the at least one of the one or more conditions; and
when the at least one of the one or more conditions are not met, disregarding the at least one of the one or more ad content.

15. The non-transitory computer readable medium of claim 11, wherein the computer readable instructions further cause the processing device to:
obtain an ad request requesting the advertisement response message; and
transmit the ad request with the identified at least one user data to the remote computing device, wherein the remote computing device is an advertising system.

16. The non-transitory computer readable medium of claim 11, wherein the computer readable instructions further cause the processing device to:
receive a search query via a user interface of an user device;
transmit the search query with the identified at least one user data to the remote computing device, wherein the remote computing device is a search system;
receive search results from the search system, the search results including organic search results and the advertisement response message; and
display a search engine results page that includes the organic search results and the advertisements that are based on the identified first ad content.

17. The non-transitory computer readable medium of claim 11,
wherein the actual user data includes a list of installed applications that are installed on an user device and the noise data includes a fake list of applications, the fake list indicating applications that are not actually installed on the user device, and
wherein the at least one user data is a combination of the list of installed applications and the fake list of applications.

18. The non-transitory computer readable medium of claim 11, wherein the first condition asks whether a particular application is installed on the user device, whereby the first ad content is selected only if the particular application installed.

19. The non-transitory computer readable medium of claim 11, wherein the computer readable instructions further cause the processing device to:
receive the advertisement response message including the one or more ad content, the one or more conditions, and one or more access mechanisms, wherein the one or more ad content, the one or more conditions, and the one or more access mechanisms are identified based on the identified at least one user data including the combination of the actual user data and the noise data by the remote computing device;
in response to identifying that a first condition among the one or more conditions is satisfied based on the actual user data, identify the first ad content corresponding to the first condition among the one or more ad content, and a first access mechanism corresponding to the first condition among the one or more access mechanisms; and
display an advertisement that is based on the first ad content and the first access mechanism.

20. An advertising system comprising:
a storage system that stores a plurality of advertisement records, each advertisement record corresponding to an advertisement and including triggering data, ad content, a fee arrangement, and one or more conditions; and
a processing system that executes computer readable instructions, the computer readable instructions causing the processing system to:
receive an ad request requesting one or more advertisements and at least one user data from a remote computing device, the at least one user data including actual user data and noise data;
identify one or more ad content and one or more conditions based on the ad request and/or the actual user data and the noise data; and
transmit an advertisement response message including the identified one or more ad content, and the identified one or more conditions to the remote computing device,
wherein in response to identifying, by the remote computing device, that a first condition among the one or more conditions is satisfied based on the actual user data, a first ad content corresponding to the first condition among the one or more ad content is identified by the remote computing device,
wherein identifying the at least one user data by the remote computing device includes:
identifying an actual user profile based on the actual user data, the actual user profile including one or more first data fields, each of the one or more first data fields having an actual value assigned thereto indicative of the actual user data;
identifying a fake user profile as the noise data, the fake user profile including one or more second data fields, each of the one or more second data fields having a fake value assigned thereto, the fake value being different than the actual value; and
obtaining the at least one user data by combining the actual user profile and the fake user profile; and
wherein an advertisement that is based on the first ad content is displayed on the remote computing device.

21. The advertising system of claim 20, wherein the remote computing device is an user device.

22. The advertising system of claim 20, wherein the remote computing device is a search system and the ad request includes one or more query terms contained in a search query transmitted by the user device to the search system.

23. The advertising system of claim 20,
wherein the processing system that executes computer readable instructions, the computer readable instructions causing the processing system to:
identify the one or more ad content, one or more access mechanisms, and the one or more conditions based on the ad request and/or the actual user data and the noise data; and
transmit the advertisement response message including the identified one or more ad content, the identified one or more access mechanisms, and the identified one or more conditions to the remote computing device,
wherein in response to identifying, by the remote computing device, that a first condition among the one or more conditions is satisfied based on the actual user data, a first ad content corresponding to the first condition among the one or more ad content, and a first access mechanism corresponding to the first condition among the one or more access mechanisms are identified by the remote computing device, and
wherein the advertisement that is based on the first ad content and the first access mechanism is displayed.

\* \* \* \* \*